(12) United States Patent
Takemoto

(10) Patent No.: US 7,158,260 B2
(45) Date of Patent: Jan. 2, 2007

(54) COLOR CONVERSION APPARATUS AND COLOR CONVERSION PROGRAM STORAGE MEDIUM

(75) Inventor: Fumito Takemoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 983 days.

(21) Appl. No.: 10/178,507

(22) Filed: Jun. 25, 2002

(65) Prior Publication Data

US 2003/0011797 A1  Jan. 16, 2003

(30) Foreign Application Priority Data

Jul. 12, 2001  (JP)  ............................. 2001-212145

(51) Int. Cl.
*B41J 1/00* (2006.01)
*G06F 15/00* (2006.01)
*G03F 3/08* (2006.01)
*G06K 9/00* (2006.01)

(52) U.S. Cl. ...................... 358/1.9; 358/518; 358/523; 382/162; 382/167

(58) Field of Classification Search ................. 358/1.9, 358/487, 518, 523, 474, 501, 505, 513, 530; 382/162, 167; 348/223.1; 345/153–155, 345/150, 431

See application file for complete search history.

(56) References Cited

U.S. PATENT DOCUMENTS

| | | | | |
|---|---|---|---|---|
| 6,466,334 B1 * | 10/2002 | Komiya et al. | ............... | 358/1.9 |
| 6,614,555 B1 * | 9/2003 | Hidaka | ........................ | 358/1.9 |
| 6,762,863 B1 * | 7/2004 | Minakuti et al. | ........... | 358/487 |
| 7,009,640 B1 * | 3/2006 | Ishii et al. | ............... | 348/223.1 |
| 2001/0038468 A1 * | 11/2001 | Hiramatsu | ................... | 358/518 |

\* cited by examiner

*Primary Examiner*—Kimberly Williams
*Assistant Examiner*—Charlotte M. Baker
(74) *Attorney, Agent, or Firm*—Sughrue Mion, PLLC

(57) ABSTRACT

A color conversion apparatus has a profile storage section storing a first sort of input profile and a second sort of input profile, which are classified in an input profile, a first color conversion section for applying a color conversion to image data in accordance with the input profiles, and an image processing section for applying a data processing of altering a tone of an image to image data after color conversion only in the event that the first color conversion section executes the a color conversion according to the second sort of input profile.

7 Claims, 5 Drawing Sheets

COLOR CONVERSION APPARATUS AND COLOR CONVERSION PROGRAM STORAGE MEDIUM

BACKGROUND OF THE INVENTION

1. Field of the Invention

The present invention relates to a color conversion apparatus for converting image data in which a color of pixels constituting an image is represented by coordinate values in a first color space into image data in which the color of the pixels is represented by coordinate values in a second color space, and a color conversion program storage medium storing a color conversion program for converting image data in which a color of pixels constituting an image is represented by coordinate values in a first color space into image data in which the color of the pixels is represented by coordinate values in a second color space.

2. Description of the Related Art

There is known various types of input devices for obtaining image data through input of an image, for example, a color scanner for reading a recorded image to obtain image data and a digital still camera (DSC) in which image data is obtained in such a manner that an image of a subject is formed on a solid state imaging device and then read. In those input devices, the image data is represented by data of a predetermined range of for example 0 to 255 on each of three colors for example red (R), green (G) and blue (B). Colors, which can be represented by numerical values in the predetermined range on each of those three colors of R, G and B, are restricted as a matter of course. For this reason, even if colors of the original image have very plentiful representation, conversion of the colors into image data once using such an input device causes an image represented by the image data to be restricted to the colors in a certain color representation area in the R, G and B color space.

Also with respect to an output device for outputting an image in accordance with image data, there are known various types of output devices, for example, a photographic printer in which a printing paper is exposed by a laser beam to develop the printing paper so that an image is recorded on the printing paper, a printer in which an image is recorded on a sheet in accordance with a system such as an electrophotographic system and an inkjet system, a printing machine in which a rotary press is rotated to create a number of printed matters, and an emissive display device such as a CRT display and a plasma display in which light is emitted on a display screen in accordance with image data to display an image. Also with respect to an output device, similar to the above-mentioned input device, there exists a color reproduction area according to the associated output device. That is, the output device is able to represent various colors in accordance with for example image data representative of three colors of R, G and B or image data representative of four colors of C (cyan), M (magenta), Y (yellow) and K (black). However, colors, which can be represented, are restricted to a certain color representation area (for example, a color representation area represented by numerical values of a range of 0 to 255 on each of colors of R, G and B) in an output device color space (for example, an RGB space and a CMYK space).

Even if a certain image data (for example, data representative of (R, G, B)=(50, 100, 200)) is concerned, a color of an image, which is obtained in accordance with such image data, is varied depending on a sort of an output device. Regarding this point, it is the same between an input device and an output device. Even if image data (R, G, B)=(50, 100, 200), which is obtained by a certain input device, is used as it is, and an image is outputted by a certain output device, a color of an image outputted from the output device is not coincident with a color of the original image entered through the input device. Accordingly, when it is intended that the original image is reproduced by a certain output device in accordance with image data obtained through reading an image by a certain input device, there is a need to convert the image data but not directly sending the image data obtained in the input device to the output device. Here, there is performed a conversion paying attention to a color of an image, and a conversion of such image data is referred to as color conversion. A LUT (Lookup table) or the like defining a relationship between image data before and after the color conversion is referred to as a color conversion definition (a color profile). Creating the color conversion definition (a color profile) is referred to as a profiling. The color conversion definition defines the association between coordinate values of two color spaces.

As mentioned above, a color representation area is varied in accordance with a device, and colors to be represented in the respective devices are different from one another even if image data is concerned with the same numerical value. On the other hand, recently, it is desired to construct a device independent type of system capable of incorporating therein a plurality of sorts of input devices and a plurality of sorts of output devices, wherein the input devices and the output devices are connected to one another. In such a device independent type of system, to perform the color conversion between the devices, there is adopted a scheme in which a common color space (a space of a device independent data) independent of a device, for example, an L*a*b* color space, is interposed, so that a color conversion for converting image data on a color space depending on an input device, which is obtained by the input device, into image data on the common color space, and a color conversion for converting the image data on the common color space into image data on a color space depending an output device are performed. In the device independent type of system, as the above-mentioned color conversion definition (a color profile), there are created an input profile defining a color conversion between a color space depending on an input device and a common color space, and an output profile defining a color conversion between a color space depending on an output device and the common color space.

By the way, in order to obtain a natural tone of image in the event that an output device outputs an image represented by image data that is obtained through photography of a camera subject such as a person and a scenery, there is a need to apply a data processing of altering a tone of an image to the image data in addition to the above-mentioned color conversion.

On the other hand, in the event that an output device outputs an image represented by image data that is obtained through reading of a photographic print and a printed matter, it is desired that the above-mentioned color conversion is applied to the image data, and a color of the image such as the photographic print and the printed matter is reproduced as it is.

For this reason, in the event that a plurality of sorts of input devices is incorporated into a device independent type of system that is the usual system, it is necessary for a user to confirm the contents of image data to decide whether the data processing is needed. This is troublesome and very inconvenient.

SUMMARY OF THE INVENTION

In view of the foregoing, it is an object of the present invention to provide a color conversion apparatus and a color conversion program storage medium storing a color conversion program, which are capable of saving one trouble of deciding whether the above-mentioned data processing is needed.

To achieve the above-mentioned object, the present invention provides a color conversion apparatus comprising:

an input profile storage section for storing a plurality of input profiles with classification into a plurality of groups, said plurality of input profiles defining an association between coordinate values of a predetermined color space depending on an input device and coordinate values of a color space independent of the input device, said input device reading an image in form of a set of pixels to derive image data in which colors of the pixels are represented by coordinate values within the predetermined color space;

an image data obtaining section for obtaining the image data derived from said input device;

an image data conversion section for converting the image data obtained by said image data obtaining section into image data in which colors of the pixels are represented by coordinate values of the color space independent of the input device, in accordance with the input profiles stored in said input profile storage section; and a tone alteration section for applying data processing of altering a tone of an image to image data converted in accordance with the input profiles classified into a predetermined group of said plurality of groups, of the image data obtained through conversion by said image data conversion section.

In the color conversion apparatus according to the present invention as mentioned above, it is acceptable that the "color space independent of an input device" is a color space common to all input profiles, or a plurality of sorts of color spaces which is distinguished in use in accordance with a sort of the input profiles.

Necessity for the data processing of altering the tone of the image may depend on a sort of an input device in principle. Input devices, for example, a digital camera and a digital video, are ones for photographing the subject such as a person and scenery. It is necessary for the image data obtained by such an input device to be subjected to the data processing as mentioned above. A so-called film scanner is one, which is used for the purpose of mainly reading an image of reversal films or the like. It is also necessary for the image data obtained by such a film scanner to be subjected to the data processing as mentioned above. To the contrary, a so-called reflection type of scanner is used for the purpose of mainly reading images of a photographic print and a printed matter. It is unnecessary for the image data obtained by the reflection type of scanner to be subjected to the data processing as mentioned above.

In view of the foregoing, according to the color conversion apparatus of the present invention, the input profiles are classified beforehand in accordance with necessity or non-necessity of the data processing as mentioned above, so that implementation or non-implementation of the data processing is determined in accordance with the classification of the input profile used in the color conversion of the image data. Thus, it is possible to suitably decide the implementation or non-implementation of the data processing, even if a user does not decide the necessity or non-necessity of the data processing, and thereby saving one trouble of decision.

In the color conversion apparatus according to the present invention as mentioned above, it is preferable that said image is concerned with a photograph of a subject, said input profile storage section stores, as the input profiles classified into the predetermined group, an input profile defining an association between the coordinate values of the predetermined color space depending on the input device and the coordinate values of the color space independent of the input device, which are representative of a color at a point on a real image of the subject associated with the pixels wherein a color is represented by the coordinate values.

According to the color conversion apparatus of the present invention as mentioned above, an image represented by the image data obtained through the color conversion according to the input profile classified into a predetermined group may reproduce a color of a real image of the subject.

It often happens that a color distribution of the real image of the subject applies to a predetermined experimental law. With respect to an image having the color distribution satisfying the experimental law, data processing according to a predetermined experimental algorithm may implement suitably a tone alteration in which an image outputted from an output device is provided in form of a natural tone of image.

Therefore, according to the above-mentioned preferable color conversion apparatus, utilization of the data processing by the above-mentioned experimental algorithm in the tone alteration section makes it possible to implement a suitable tone alteration.

To achieve the above-mentioned object, the present invention provides a color conversion program storage medium storing a color conversion program, which causes a computer to operate as a color conversion apparatus when the color conversion program is incorporated in the computer, said color conversion apparatus comprising:

an input profile storage section for storing a plurality of input profiles with classification into a plurality of groups, said plurality of input profiles defining an association between coordinate values of a predetermined color space depending on an input device and coordinate values of a color space independent of the input device, said input device reading an image in form of a set of pixels to derive image data in which colors of the pixels are represented by coordinate values within the predetermined color space;

an image data obtaining section for obtaining the image data derived from said input device;

an image data conversion section for converting the image data obtained by said image data obtaining section into image data in which colors of the pixels are represented by coordinate values of the color space independent of the input device, in accordance with the input profiles stored in said input profile storage section; and a tone alteration section for applying data processing of altering a tone of an image to image data converted in accordance with the input profiles classified into a predetermined group of said plurality of groups, of the image data obtained through conversion by said image data conversion section.

DETAILED DESCRIPTION OF PREFERRED EMBODIMENTS

Embodiments of the present invention will be described with reference to the accompanying drawings.

Figure 1:
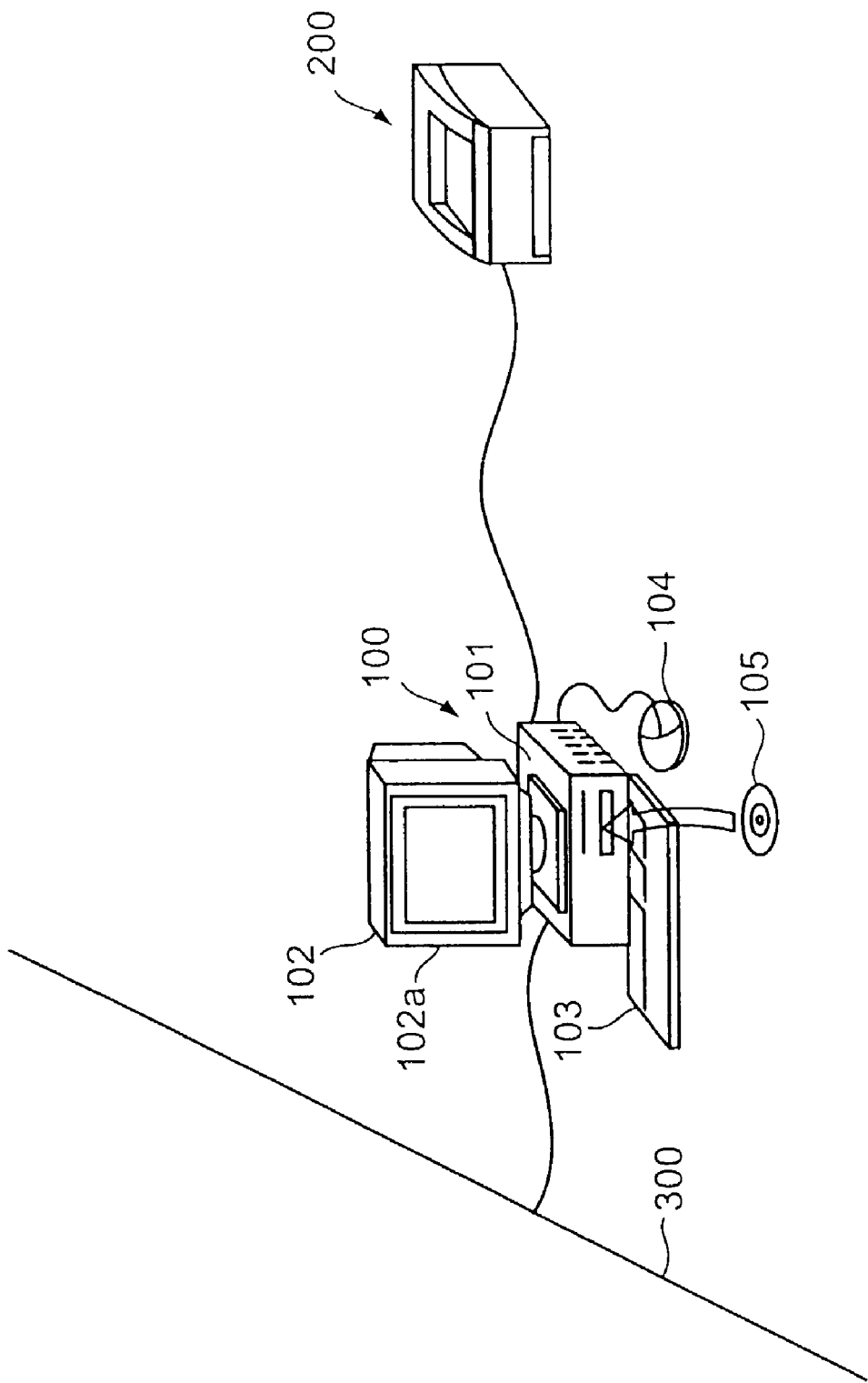
FIG. 1 is a schematic construction view of a computer system constituting an embodiment of a color conversion apparatus of the present invention.

FIG. 1 is a schematic construction view of a computer system constituting an embodiment of a color conversion apparatus of the present invention.

FIG. 1 exemplarily shows a computer network in which a computer system 100 and a printer 200 are incorporated therein.

The computer system 100 is connected to an external computer system (not illustrated) via the communication network 300. The computer system 100 give and take image data with the external computer system, so that images represented by the image data are outputted to a printer 200. Incidentally, it is acceptable that image data is given and taken through a storage medium such as CD-R (Compact Disc Recordable) and MO disk (magneto-optical disk), other than being given and taken via the communication network 300.

The computer system 100 shown in FIG. 1 comprises a main frame 101, which incorporates a CPU, a main memory unit, a hard disk, a communicating board, etc., a CRT display 102 for performing a display of image planes and character strings on a display screen 102a in accordance with an instruction from the main frame 101, a keyboard 103 for entering user's instruction and character information into the computer system 100, and a mouse 104 for designating an arbitrary position on the display screen 102a to enter an instruction according to an icon displayed on the designated position.

A CD-ROM 105 is detachably mounted on the main frame 101, and the main frame 101 incorporates therein a CD-ROM drive to reproduce information stored in the CD-ROM 105 thus mounted. Further, MO (magneto-optical disk) 106 (cf. FIG. 2) is detachably mounted on the main frame 101, and the main frame 101 also incorporates therein a MO drive to perform recording and reproduction for information onto the MO 106 thus mounted.

Figure 2:
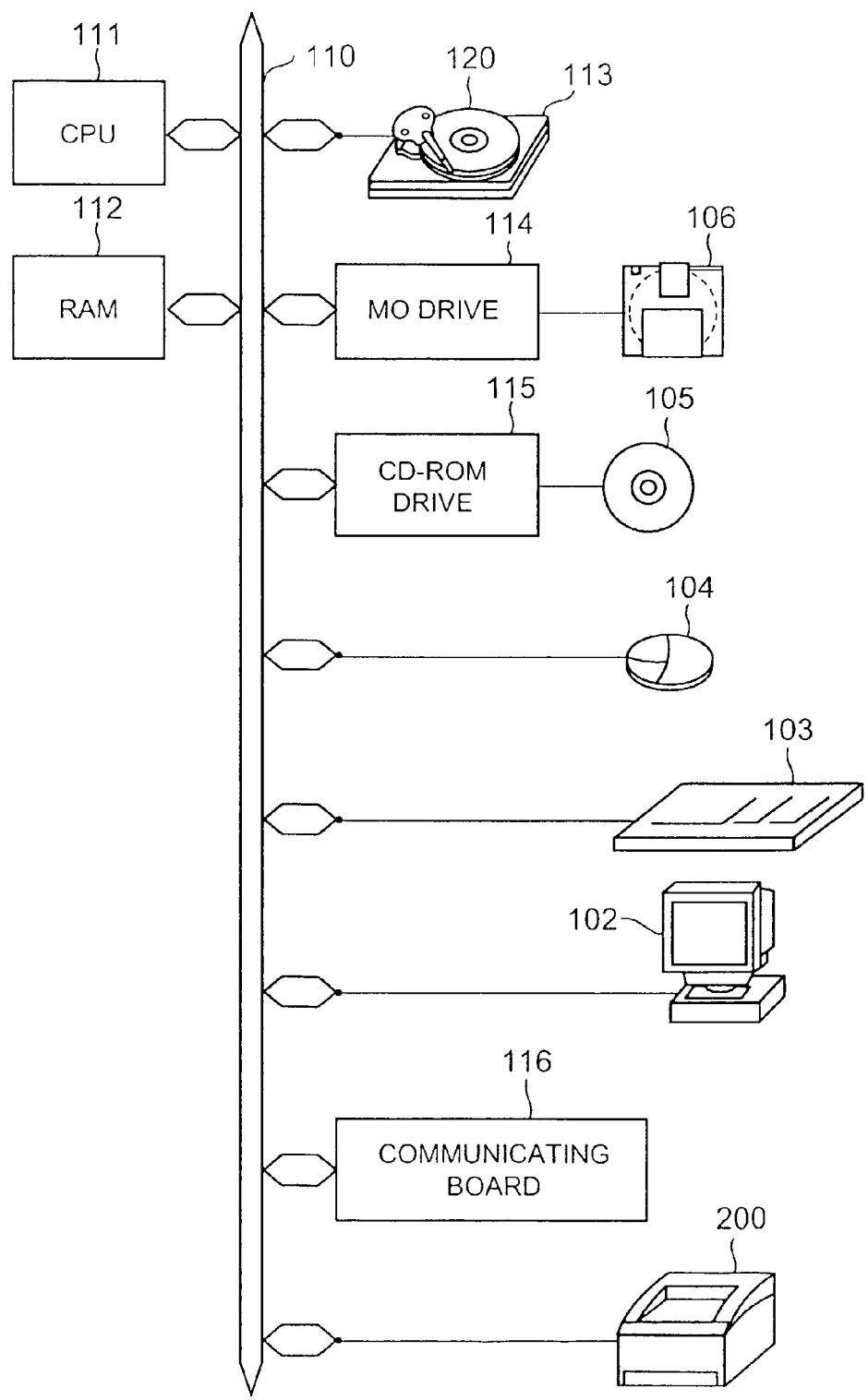
FIG. 2 is a hardware construction view of the computer system shown in FIG. 1.

FIG. 2 is a hardware construction view of the computer system shown in FIG. 1.

The hardware construction view of the computer system shows a CPU 111, a RAM 112, an HDD (a hard disk drive) 113, a MO drive 114, a CD-ROM drive 115, and a communicating board 116. Those are connected to one another through a bus 110.

The HDD 113 incorporates therein a hard disk 120, which is a sort of recording medium, and performs recording and reproduction for information onto the hard disk 120.

The communicating board 116 is connected to a communication line such as a LAN (Local Area Network). The computer system 100 shown in FIG. 1 is able to perform transmission and reception of data with another computer system, through the communication network 300 connected via the communicating board 116.

FIG. 2 further shows a mouse 104, a keyboard 103, a CRT display 102 and a printer 200, which are connected via a plurality of I/O interfaces (not illustrated) to the bus 110.

Here, the CD-ROM 105 stores the color conversion program according to an embodiment of the present invention. The CD-ROM 105 is mounted on the main frame 101, so that the color conversion program stored in the CD-ROM 105 is read by the CD-ROM drive 115 and is installed via the bus 110 in the hard disk 120.

In FIG. 1, as the storage medium for storing the color conversion program, there is used the CD-ROM 105. However, the storage medium for storing the color conversion program referred to in the present invention is not restricted to the CD-ROM. It is acceptable to adopt, as the storage medium, an optical disk, a magneto-optical disk, a floppy (registered trademark), and a magnetic tape.

When the color conversion program installed in the hard disk 120 is driven, the color conversion definition program in the hard disk 120 is loaded onto a RAM 112 and is executed by the CPU 111. When the color conversion program is driven and executed, the computer system 100 operates as the color conversion apparatus. In other words, the combination of the computer system 100 and the color conversion program according to the embodiment of the present invention may constitute a color conversion apparatus according to the embodiment of the present invention.

Figure 3:
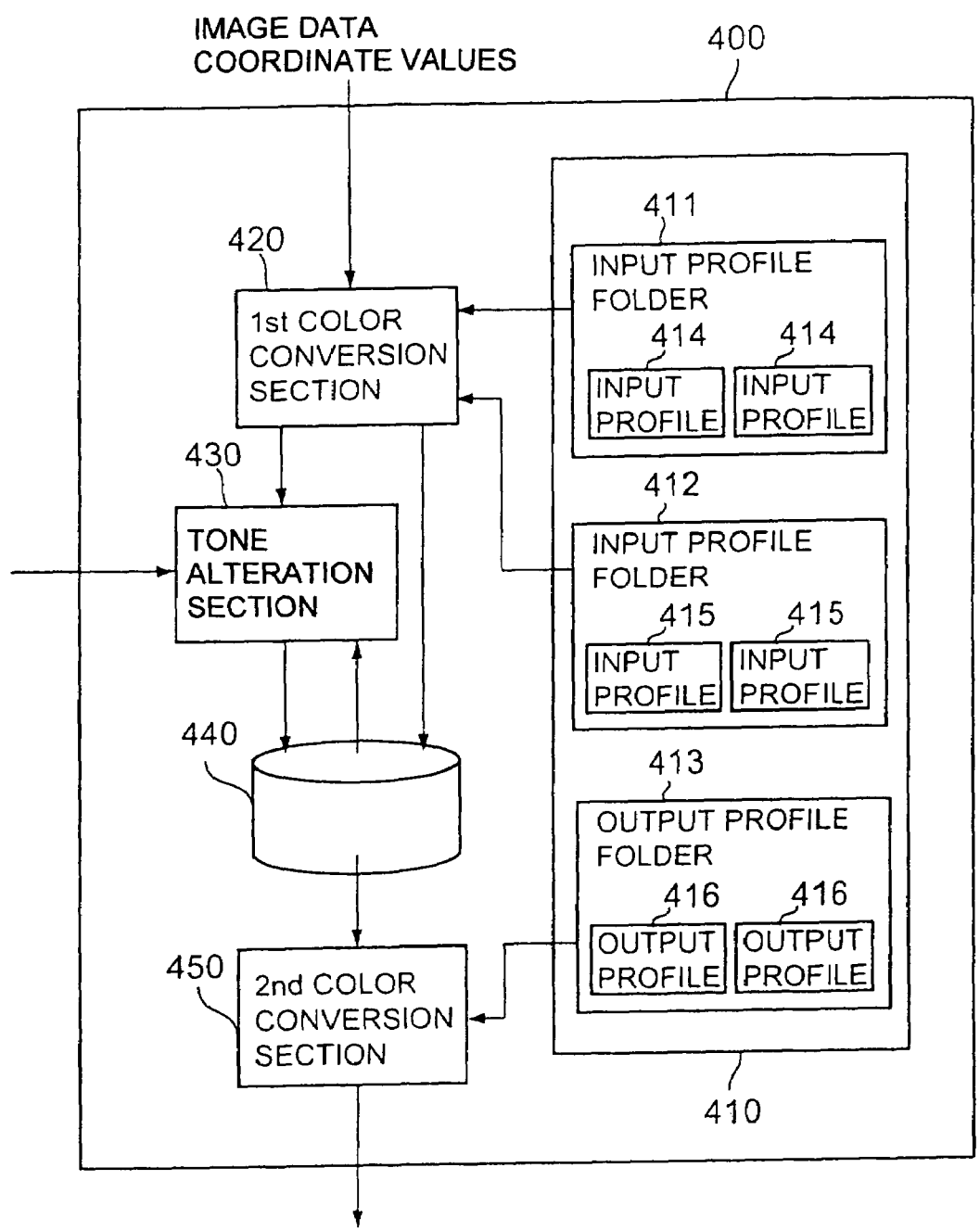
FIG. 3 is a functional block diagram showing an embodiment of a color conversion apparatus of the present invention.

FIG. 3 is a functional block diagram showing an embodiment of a color conversion apparatus of the present invention.

A color conversion apparatus 400 comprises a profile storage section 410, a first color conversion section 420 and an image processing section 430. A color conversion program according to an embodiment of the present invention is constructed by a software implementing functions of the profile storage section 410, the first color conversion section 420 and the image processing section 430.

The profile storage section 410 is an example of the input profile storage section referred to in the present invention, and stores a first sort of input profile 414 and a second sort of input profile 415, which are classified in an input profile, in a first input profile folder 411 and a second input profile folder 412, respectively. The first sort of input profile 414 is an input profile corresponding to a so-called reflection type of scanner. The second sort of input profile 415 is an input profile corresponding to an input device such as a digital still camera and a film scanner, and is an example of the "input profile classified into a predetermined group" referred to in the present invention. According to the present embodiment, the profile storage section 410 is also provided with an output profile folder 413, which stores an output profile 416.

The first color conversion section 420 is one serving both as an example of the image data obtaining section and an example of the image data conversion section referred to in the present invention. The first color conversion section 420 obtains image data via the communication network 300 shown in FIG. 1 and the MO (magneto-optical disk) 106. This image data represents a color of a pixel in a color space depending on an input device, for example, a CMY color space and an RGB color space. It is assumed that an image represented by the image data is a photograph of a subject such as a person and scenery. The image data describes a sort of an input device that outputted the image data. The first color conversion section 420 reads an input profile associated with the input device suitably from the first input profile folder 411 and the second input profile folder 412 of the profile storage section 410. The first color conversion section 420 applies the color conversion to the image data in accordance with the input profile thus read. This color conversion converts the image data into image data in which a color of a pixel is represented by the sRGB color space which is an example of a common color space which is independent of a device.

According to the present embodiment, a color of an image of a reflection copy read by a reflection type of scanner is reproduced by a color conversion according to the first sort of input profile 414 stored in the first input profile folder 411. A color of a real image of a subject on a photograph is reproduced by a color conversion according to the second sort of input profile 415 stored in the second input profile folder 412.

The image processing section 430 is an example of the tone alteration section referred to in the present invention. The image processing section 430 applies a data processing of altering a tone of an image to image data after color conversion only in the event that the first color conversion section 420 executes the color conversion according to the second sort of input profile 415. Hereinafter, it happens that "data processing for altering a tone of an image" is referred to as the image processing. Contents of the image processing will be described in detail later.

The color conversion apparatus 400 further comprises an image data store section 440 and a second color conversion section 450.

The image data store section 440 stores the image data subjected to the image processing by the image processing section 430. In the event that the first color conversion section 420 executes the color conversion according to the first sort of input profile 414, the first color conversion section 420 causes the image data store section 440 to directly store therein the image data after color conversion.

The second color conversion section 450 applies a color conversion according to the output profile 416 stored in the output profile folder 413 of the profile storage section 410 to the image data stored in the image data store section 440. The output profile folder 413 stores therein as the output profile 416 an output profile associated with the output device such as the printer 200 and the CRT display 102 shown in FIG. 1. The second color conversion section 450 applies a color conversion according to the output profile associated with the output device that outputs the image to the image data. This color conversion converts the image data to image data representative of a color of a pixel in the CMY color space and the like depending on an output device. And the second color conversion section 450 outputs the image data after the color conversion to the output device.

Figure 4:
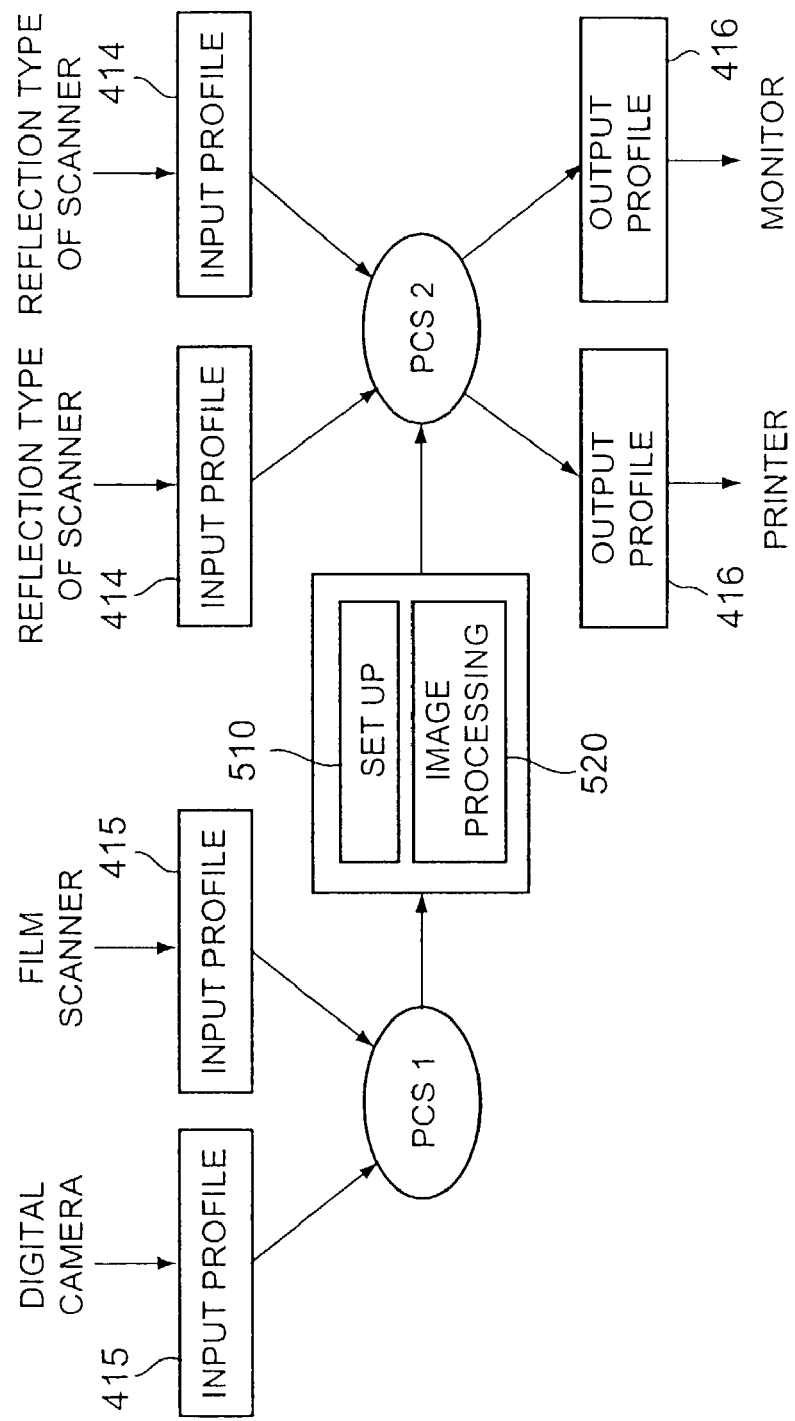
FIG. 4 is a conceptual view useful for understanding color conversion and image processing by a color conversion apparatus.

FIG. 4 is a conceptual view useful for understanding color conversion and image processing by the color conversion apparatus 400.

When the flow of the color conversion and the image processing, which has been explained in conjunction with the functional block diagram of FIG. 3, is expressed on a conceptual basis, it becomes the conceptual view shown in FIG. 4.

When the image data obtained by a reflection type of scanner is subjected to the color conversion according to the first sort of input profile 414, there is obtained image data representative of an image belonging to a color space PCS2 to reproduce a color of a reflection copy. The image belonging to a color space PCS2 is an image of a color suitable for an output of an output device. When the image data representative of the image is color-converted in accordance with the output profile associated with a printer and a monitor (a CRT display) and is fed to the printer or the monitor, an image of the reflection copy is reproduced by the printer and the monitor. The reflection copy has a preferable tone of image, and an image reproduced by the printer and the monitor has also a preferable tone.

On the other hand, when the color conversion according to the second sort of input profile 415 is applied to the image data obtained by a digital still camera and a film scanner, there is obtained image data representative of an image belonging to the color space PCS1 to reproduce a color of a real image of the subject. It is noted that the color space PCS1 is to be distinguished from the color space PCS2 on a conceptual basis. The color space PCS1 and the color space PCS2 are concerned with the sRGB color space.

According to the image belonging to the color space PCS1, there is established such an experimental law that for example, when colors of the whole pixels constituting an image are summed up, substantial gray color can be obtained, a color at the highest point in brightness of the image is white, while a color at the lowest point in brightness of the image is black, and the portion to be noticed of the image involves a peak in a color distribution. According to the above-mentioned image processing section, a so-called set up 510 and an image processing 520 according to the set up 510 are executed in accordance with the algorithm based on such an experimental law.

Figure 5:
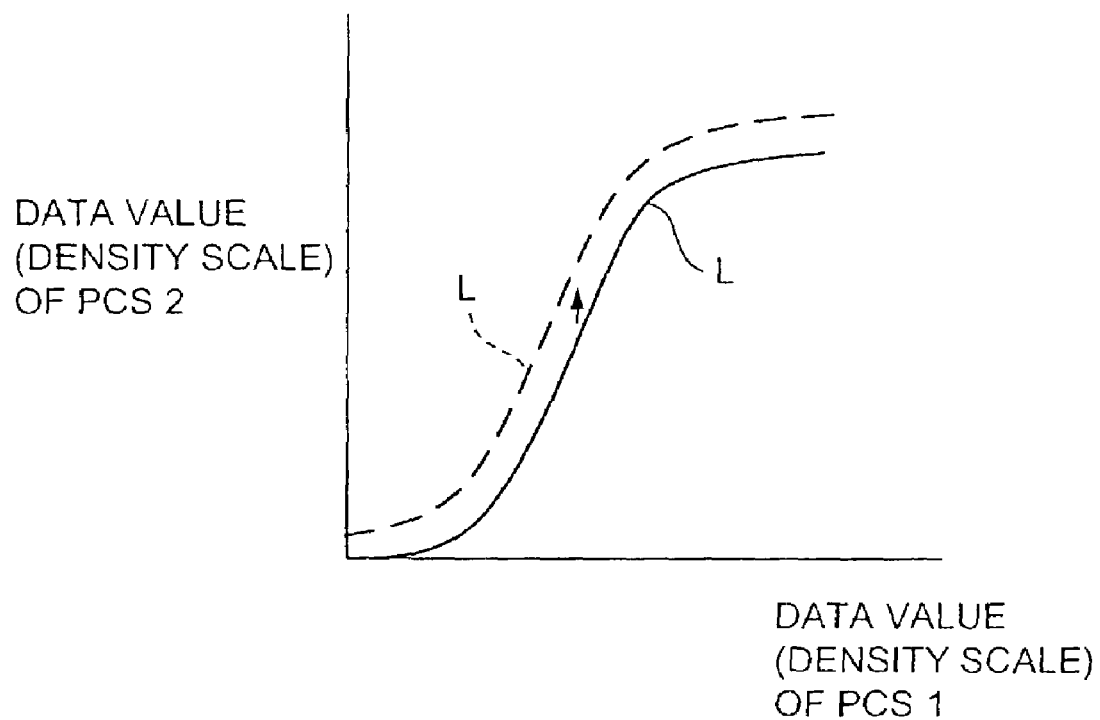
FIG. 5 is an explanatory view useful for understanding set up and image processing.

FIG. 5 is an explanatory view useful for understanding set up and image processing.

A horizontal axis and a vertical axis of a graph shown in FIG. 5 represent data values of image data belonging to the color space PCS1 and the color space PCS2, respectively, wherein as the data values, there are used values converted from coordinate values of the sRGB color space to density values.

According to the above-mentioned set up, there is prepared an S-character like shaped tone conversion curve L shown in FIG. 5 with a solid line beforehand. A slope at the intermediate portion of the tone conversion curve L is about 1.6. A correction amount of density is determined in accordance with the above-mentioned experimental law so that the tone conversion curve L is corrected and a tone conversion curve L' shown in FIG. 5 with a dotted line is obtained. Image data representing an image belonging to the color space PCS1 is converted on a density scale basis into image data representing an image belonging to the color space PCS2 in accordance with the corrected tone conversion curve L'.

The image belonging to the color space PCS2, which is represented by the image data obtained by the above-mentioned set up and image processing, provides the natural tone at the image portion to be noticed. In other words, the image data passing through the set up 510 and the image processing 520 shown in FIG. 4 is image data suitable for output by the output device, in a similar fashion to that of the image data color-converted in accordance with the input profile 414 associated with the reflection type of scanner, so that a printer and a monitor may output an image having a preferable tone.

As mentioned above, a selection between execution and non-execution of the image processing in accordance with a sort of the input profiles 414 and 415 used in the color conversion may cause the printer 200 and the CRT display 102 shown in FIG. 1 to output a preferable tone of image. Accordingly, it is possible for a user of the color conversion apparatus 400 to save one trouble for deciding whether the data processing is necessary.

It happens, however, that the selection between execution and non-execution of the image processing in accordance with a sort of the input profiles 414 and 415 is absolutely right, and it is desired to apply the image processing even if an image of the reflection copy is concerned. For this reason, the image processing section 430 of the color conversion apparatus 400 incorporates therein a function of receiving designation of image data by a user. In the event that image data stored in the image data store section 440 is designated, the set up and the image processing related to the designated image data are carried out. In this case, since the above-mentioned experimental law cannot be utilized for the set up, a set up by a user's operation is performed.

In the image processing section 430 of the color conversion apparatus 400 incorporates therein also a function of executing an image processing such as a color correction in accordance with an instruction of a user, so that the image processing is applied to the image data stored in the image data store section 440 in accordance with the instruction of the user.

Incidentally, according to the present embodiment, while the sRGB space is shown as an example of the "color space independent of an input device" referred to in the present invention, it is acceptable that the "color space independent of an input device" referred to in the present invention is a CIEXYZ color space, or a Lab color space. Further, it is acceptable that those color spaces are common to all input profiles, or are distinguished in use in accordance with a sort of the input profiles.

Further, according to the present embodiment, while a plurality of folders is used to classify the input profiles, it is acceptable to classify the input profiles by file names and expansions, or a classified table.

As mentioned above, according to the present invention, it is possible to save one trouble of deciding whether the data processing for altering the tone of an image is needed.

Although the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A color conversion apparatus comprising:
   an input profile storage section for storing a plurality of input profiles with classification into a plurality of groups, said plurality of input profiles each defining an association between coordinate values of a predetermined color space depending on each input device and coordinate values of a color space independent of the input device, said input device reading an image in form of a set of pixels to derive image data in which colors of the pixels are represented by coordinate values within the predetermined color space;
   an image data obtaining section for obtaining the image data derived from said input device;
   an image data conversion section for converting the image data obtained by said image data obtaining section into image data in which colors of the pixels are represented by coordinate values of the color space independent of the input device, in accordance with the input profiles stored in said input profile storage section; and
   a tone alteration section for applying data processing of altering a tone of an image to image data converted in accordance with the input profiles classified into a predetermined group of said plurality of groups, of the image data obtained through conversion by said image data conversion section.

2. A color conversion apparatus according to claim 1, wherein said image is concerned with a photograph of a subject,
   said input profile storage section stores, as the input profiles classified into the predetermined group, an input profile defining an association between the coordinate values of the predetermined color space depending on the input device and the coordinate values of the color space independent of the input device, which are representative of a color at a point on a real image of the subject associated with the pixels wherein a color is represented by the coordinate values.

3. A color conversion program embodied on a computer readable medium, which causes a computer to operate as a color conversion apparatus when the color conversion program is incorporated in the computer, said color conversion program comprising: an image data obtaining logic for obtaining the image data derived from an input device which reads an image in form of a set of pixels to derive the image data in which colors of the pixels are represented by coordinate values within a predetermined color space depending on the input device; an image data conversion logic for converting the image data obtained by said image data obtaining logic into image data in which colors of the pixels are represented by coordinate values of a color space independent of the input device, in accordance with a plurality of input profiles stored in an input profile storage which stores said plurality of input profiles with classification into a plurality of groups, said plurality of input profiles each defining an association between coordinate values of a predetermined color space depending on each input device and coordinate values of a color space independent of said each input device; and a tone alteration logic for applying data processing of altering a tone of an image to image data converted in accordance with the input profiles classified into a predetermined group of said plurality of groups, of the image data obtained through conversion by said image data conversion logic.

4. A color conversion apparatus according to claim 1, wherein said tone alteration section applies the data processing only if said image data conversion section converts the image data in accordance with input profiles corresponding to a digital still camera or a film scanner.

5. A color conversion program embodied on a computer readable medium according to claim 3, wherein said tone alteration logic applies the data processing only if said image data conversion logic converts the image data in accordance with input profiles corresponding to a digital still camera or a film scanner.

6. A color conversion apparatus according to claim 1, wherein the input profiles correspond to respective different plurality of input devices.

7. A color conversion apparatus according to claim 6, wherein the classification includes a first set of input devices requiring tone process and a second set of input devices not requiring the tone process, and wherein the tone process is performed according to the classification.

* * * * *